(12) United States Patent
Wang et al.

(10) Patent No.: US 11,747,155 B2
(45) Date of Patent: Sep. 5, 2023

(54) GLOBAL PATH PLANNING METHOD AND DEVICE FOR AN UNMANNED VEHICLE

(71) Applicant: GOERTEK INC., Shandong (CN)

(72) Inventors: Xueqiang Wang, Shandong (CN); Yifan Zhang, Shandong (CN); Libing Zou, Shandong (CN); Baoming Li, Shandong (CN)

(73) Assignee: GOERTEK INC., Shandong (CN)

( * ) Notice: Subject to any disclaimer, the term of this patent is extended or adjusted under 35 U.S.C. 154(b) by 6 days.

(21) Appl. No.: 17/593,618

(22) PCT Filed: Oct. 24, 2020

(86) PCT No.: PCT/CN2020/123474
§ 371 (c)(1),
(2) Date: Sep. 21, 2021

(87) PCT Pub. No.: WO2021/135554
PCT Pub. Date: Jul. 8, 2021

(65) Prior Publication Data
US 2022/0196414 A1    Jun. 23, 2022

(30) Foreign Application Priority Data

Dec. 31, 2019    (CN) .......................... 201911414795.X (51) Int. Cl.
*G01C 21/34*    (2006.01)
*G05B 13/02*    (2006.01)
(52) U.S. Cl.
CPC ....... *G01C 21/3446* (2013.01); *G05B 13/027* (2013.01)
(58) Field of Classification Search
CPC .............. G01C 21/3446; G05B 13/027; G05D 1/0274; G05D 1/0221; G05D 1/0223;
(Continued)

(56) References Cited

U.S. PATENT DOCUMENTS

2019/0190815 A1    6/2019    Thubert et al.
2019/0384303 A1*    12/2019    Muller ..................... G06N 3/08
(Continued)

FOREIGN PATENT DOCUMENTS

CN    106970615 A    7/2017
CN    107065881 A    8/2017
(Continued)

OTHER PUBLICATIONS blog.csdn.net, GA3C In Reinforcement Learning, Aug. 11, 2017.
Research and Implementation of Unmanned Vehicle Path Planning Based on Reinforcement Learning, Jun. 10, 2019.

*Primary Examiner* — Rami Khatib
(74) *Attorney, Agent, or Firm* — LKGlobal | Lorenz & Kopf, LLP (57) ABSTRACT

A global path planning method and device for an unmanned vehicle are disclosed. The method comprises: establishing an object model through a reinforcement learning method, wherein the object model includes: a state of the unmanned vehicle, an environmental state described by a map picture, and an evaluation index of a path planning result; building a deep reinforcement learning neural network based on the object model established, to obtain a stable neural network model; inputting the map picture of the environment state and the state of the unmanned vehicle into the deep reinforcement learning neural network after trained, and generating a motion path of the unmanned vehicle. According to the present disclosure, the environment information in the scene is marked through the map picture, and the map features are extracted through the deep neural network, thereby simplifying the modeling process of the map scene.

18 Claims, 3 Drawing Sheets

(58) Field of Classification Search
CPC .. G05D 1/0276; G05D 1/0289; G05D 1/0291; G05D 2201/02
See application file for complete search history.

(56) References Cited

U.S. PATENT DOCUMENTS

2020/0333789 A1* 10/2020 Suzuki ................ G05D 1/0297
2021/0012124 A1*  1/2021 Kim .................... G01C 21/3602
2021/0095970 A1*  4/2021 Lu ....................... G05D 1/0257

FOREIGN PATENT DOCUMENTS

| CN | 108062699 | A | 5/2018 |
| CN | 108803321 | A | 11/2018 |
| CN | 108803615 | A | 11/2018 |
| CN | 109509254 | A | 3/2019 |
| CN | 109726866 | A | 5/2019 |
| CN | 109947098 | A | 6/2019 |
| CN | 110333739 | A | 10/2019 |
| CN | 10530371 | A | 12/2019 |
| CN | 110568841 | A | 12/2019 |
| CN | 111061277 | A | 4/2020 |
| KR | 20190140491 | A | 12/2019 |

* cited by examiner

GLOBAL PATH PLANNING METHOD AND DEVICE FOR AN UNMANNED VEHICLE

CROSS-REFERENCE TO RELATED APPLICATION

This Application is a U.S. National-Stage entry under 35 U.S.C. § 371 based on International Application No. PCT/CN2020/123474, filed Oct. 24, 2020 which was published under PCT Article 21(2) and which claims priority to Chinese Application No. 201911414795.X, filed Dec. 31, 2019, which are all hereby incorporated herein in their entirety by reference.

TECHNICAL FIELD

This Application pertains to the field of global path planning for an unmanned vehicle, in particular to a global path planning method and device for an unmanned vehicle.

BACKGROUND

In recent years, unmanned vehicles have been increasingly widely used in intelligent manufacturing and logistics fields, and can effectively improve the transportation efficiency in production, manufacturing and conveying stages, and reduce the human workload. Among them, the unmanned vehicle is guided by the global path planning method to search for the best path in the work scene, and thus the working efficiency of the unmanned vehicle can be improved and accidents such as collisions can be avoided. Common path planning algorithms, such as A* algorithm and artificial potential field method, have problems such as high computational cost and liability to be involved in local minimum solutions. The artificial intelligence algorithm based on the deep reinforcement learning method can perform trajectory marking without the need of manual work, and is suitable for dynamically changing scenes. The deep reinforcement learning method combines reinforcement learning and deep neural networks. Reinforcement learning mainly uses trial and error methods to search for optimal strategies. Deep neural networks help reinforcement learning to solve the problems such as high-dimensional spatial input and action space continuity. At the same time, with the rapid development of deep neural networks in the field of image classification and recognition, deep neural networks can be used to accurately extract the features of map pictures and effectively express information. The above work provides a theoretical basis for realizing global path planning based on map pictures and states of the unmanned vehicle.

However, in the process of realizing the global path planning for an unmanned vehicle, there are still a range of problems such as modeling difficulties, long training time of neural network models and poor model performance. In addition, other objects, desirable features and characteristics will become apparent from the subsequent summary and detailed description, and the appended claims, taken in conjunction with the accompanying drawings and this background.

SUMMARY

In view of the above problems, the embodiments of the present disclosure propose a global path planning method and device for an unmanned vehicle, so as to solve or partially solve the above problems.

According to an aspect of the embodiments of the present disclosure, a global path planning method for an unmanned vehicle is provided. The method comprises:
establishing an object model for describing a sequential decision making process of unmanned vehicle path planning through a reinforcement learning method, wherein the object model includes: a state of the unmanned vehicle, an environmental state described by a map picture, and an evaluation index of a path planning result;
building a deep reinforcement learning neural network based on the object model established, and training the deep reinforcement learning neural network using the state of the unmanned vehicle and the map picture of the environmental state until a stable neural network model is obtained; and
after path planning is initiated, inputting the map picture of the environment state and the state of the unmanned vehicle in a current task scene into the deep reinforcement learning neural network after trained, and generating a motion path of the unmanned vehicle according to the evaluation index of the path planning result output by the deep reinforcement learning neural network.

According to another aspect of the embodiments of the present disclosure, a global path planning device for an unmanned vehicle is provided. The device comprises:
a modeling unit for establishing an object model for describing a sequential decision making process of unmanned vehicle path planning through a reinforcement learning method, wherein the object model includes: a state of the unmanned vehicle, an environmental state described by a map picture, and an evaluation index of a path planning result;
a training unit for building a deep reinforcement learning neural network based on the object model established, and training the deep reinforcement learning neural network using the state of the unmanned vehicle and the map picture of the environmental state until a stable neural network model is obtained; and
an implementing unit for, after path planning is initiated, inputting the map picture of the environment state and the state of the unmanned vehicle in a current task scene into the deep reinforcement learning neural network after trained, and generating a motion path of the unmanned vehicle according to the evaluation index of the path planning result output by the deep reinforcement learning neural network.

The embodiments of the present disclosure establish an object model for describing the sequential decision making process of unmanned vehicle path planning through a reinforcement learning method, and build a deep reinforcement learning neural network based on the object model, so that after the path planning is initiated, the movement path of the unmanned vehicle can be generated by inputting the map picture of the environment state and the state of the unmanned vehicle in a current task scene into the deep reinforcement learning neural network after trained, thereby realizing the global path planning for the unmanned vehicle based on the map picture.

The technical solutions of the embodiments of the present disclosure use the map picture in the object model to mark the environmental information in the scene, and use the map picture and the state of the unmanned vehicle of the task scene as inputs of path planning, thereby significantly simplifying the modeling process of the map scene. Moreover, the map features are extracted through the deep neural network, and the map picture of the scene is used to realize the path planning, thereby greatly improving the accuracy and efficiency.

The above description is only an overview of the technical solutions of the present disclosure. In order to more clearly understand the technical means of the present disclosure so as to implement the present disclosure according to the contents of the specification, and in order to make the above and other objectives, features and advantages of the present disclosure more obvious and understandable, specific embodiments of the present disclosure will be illustrated hereinafter.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Hereinafter, exemplary embodiments of the present disclosure will be described in more detail with reference to the drawings. Although the drawings show the exemplary embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

Figure 1:
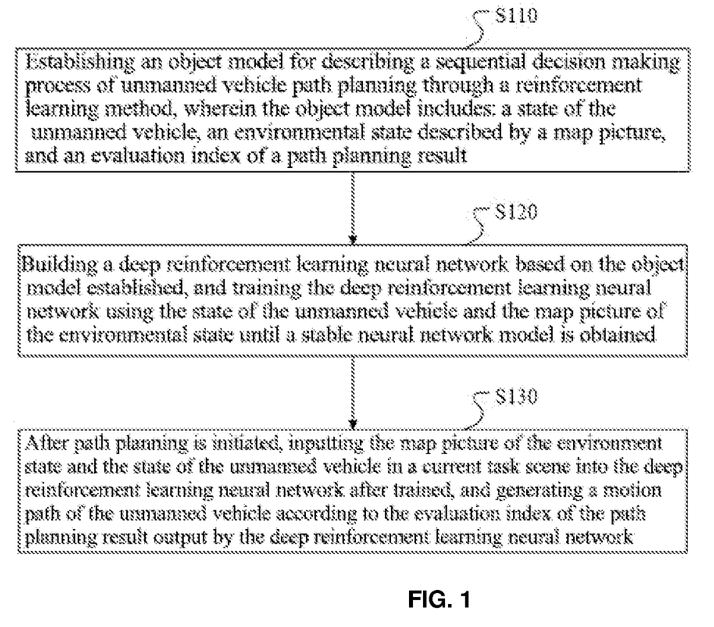
FIG. 1 is a schematic flowchart of a global path planning method for an unmanned vehicle according to an embodiment of the present disclosure.

FIG. 1 is a schematic flowchart of a global path planning method for an unmanned vehicle according to an embodiment of the present disclosure. As shown in FIG. 1, the global path planning method for an unmanned vehicle in the present embodiment comprises the following steps:

step S110: establishing an object model for describing a sequential decision making process of unmanned vehicle path planning through a reinforcement learning method, wherein the object model includes: a state of the unmanned vehicle, an environmental state described by a map picture, and an evaluation index of a path planning result;

step S120: building a deep reinforcement learning neural network based on the object model established, and training the deep reinforcement learning neural network using the state of the unmanned vehicle and the map picture of the environmental state until a stable neural network model is obtained; and step S130: after path planning is initiated, inputting the map picture of the environment state and the state of the unmanned vehicle in a current task scene into the deep reinforcement learning neural network after trained, and generating a motion path of the unmanned vehicle according to the evaluation index of the path planning result output by the deep reinforcement learning neural network.

In sum, the technical solution of the present disclosure establishes an object model for describing the sequential decision making process of unmanned vehicle path planning through a reinforcement learning method, and builds a deep reinforcement learning neural network based on the object model, so that after the path planning is initiated, the movement path of the unmanned vehicle can be generated by inputting the map picture of the environment state and the state of the unmanned vehicle in a current task scene into the deep reinforcement learning neural network after trained, thereby realizing the global path planning for the unmanned vehicle based on the map picture. The technical solution of the present embodiment of the present disclosure uses the map picture in the object model to mark the environmental information in the scene, and uses the map picture and the state of the unmanned vehicle of the task scene as inputs of path planning, thereby significantly simplifying the modeling process of the map scene. Moreover, the map features are extracted through the deep neural network, and the map picture of the scene is used to realize the path planning, thereby greatly improving the accuracy and efficiency.

Based on the technical solution shown in FIG. 1, further, in an embodiment of the present disclosure, the above step S110 specifically uses the Markov decision process $\{s, a, p, r, \gamma\}$ to describe the sequential decision making process of unmanned vehicle path planning, combined with a reinforcement learning method, to establish an object model. The Markov decision process (MDP) is a mathematical model of sequential decision, which is used to simulate the randomness strategies and rewards that can be achieved by the agent in an environment having Markov properties in the system state.

In the application scenario of global path planning for an unmanned vehicle in the present embodiment, the object model includes: a state s, an action a, a state transition model p, a reward r, and a discount factor $\gamma$. The specific content of each of the above object model is as follows.

The state s includes: the state $s_a$ of the unmanned vehicle and the environmental state $s_e$.

The state $s_a$ of the unmanned vehicle includes a position, a direction, a size and a current speed of the unmanned vehicle, a target position and a target direction, and the state $s_a$ of the unmanned vehicle is obtained without relying on a specific sensor, which is expressed as follows:

$$s_a = [p_x, p_y, \theta, v, \omega, p_{gx}, p_{gy}, \theta_g, r] \in \mathbb{R}^9$$

where, in the environment-based global coordinate system $\Sigma_e$, $(p_x, p_y)$ represents the current position of the unmanned vehicle, $\theta$ represents the direction, r represents the size of the vehicle body, $(p_{gx}, p_{gy})$ represents the target position, $\theta_g$ represents the target direction; in the unmanned vehicle-based body coordinate system $\Sigma_b$, v represents the linear velocity, and ω represents the angular velocity.

In the present embodiment, the map and the state of the unmanned vehicle are used as inputs, and the method of constructing the map and the method of obtaining the state of the unmanned vehicle do not rely on a specific sensor, and thus the present embodiment has a wide range of applications.

The environmental state $s_e$ is described by a map in the form of a picture. The picture describing the environmental state $s_e$ is a global map picture on which at least passable areas and obstacle areas of the map are marked to define the scope of the unmanned vehicle path planning. It can be expressed as follows:

$$s_e \Sigma \mathbb{R}^{m \times n \times 1}$$

where $\mathbb{R}$ represents a set of real numbers.

The current state $s_t$ of the unmanned vehicle at a moment t is expressed as $s_t = [s_a; s_e]$.

The action a taken by the unmanned vehicle includes the linear velocity v and the angular velocity ω of the unmanned vehicle in the body coordinate system $\Sigma_b$. The action a is described based on the body coordinate system $\Sigma_b$, and is not affected by the coordinate transformation of the global coordinate system $\Sigma_e$ in different scenarios. The action $a_t$ at a moment t is expressed as follows:

$$a_t = [v_t, \omega_t] \in \mathbb{R}^2$$

The state transition model p represents a probability of the unmanned vehicle taking action $a_t$ in the current state $s_t$ to transfer to the next state $s_{t+1}$, and is expressed as follows:

$$P(s_{t+1}, s_t | a_t)$$

The reward r describes a reward given to an action taken by the unmanned vehicle, and the reward includes at least two description types: a first description type which is a reward $R_{goal}$ given when the unmanned vehicle reaches or approaches a target, and a second description type which is a penalty $R_{coll}$ given when the unmanned vehicle collides or approaches an obstacle.

Specifically, the first description type is set in the following way: when the unmanned vehicle reaches the target position, a positive maximum reward value is given; a discount coefficient is set based on the distance, a discount reward value is calculated from the discount coefficient and the maximum reward value; when the distance between the unmanned vehicle and the target position is less than the distance threshold, the discount reward value is given; and when the distance between the unmanned vehicle and the target position is greater than the distance threshold, no reward is given.

It can be expressed as follows:

$$R_{goal} = \begin{cases} \alpha & \text{if } p \approx p_g, \theta \approx \theta_g & (1) \\ i * \alpha & \text{if } p \rightarrow p_g & (2) \\ 0 & \text{otherwise} & (3) \end{cases}$$

where formula (1) indicates that when the unmanned vehicle reaches a target position $p_g$ and a target direction $\theta_g$, a reward α is given, and in order to reflect the nature of the reward, α adopts a positive value; formula (2) indicates that when the unmanned vehicle approaches the target position $p_g$ (that is, the distance between the unmanned vehicle and the target is less than a distance threshold), a reward i*α is given, and i represents the discount coefficient calculated based on distance; formula (3) indicates that the unmanned vehicle is far away from the target position $p_g$ (that is, the distance between the unmanned vehicle and the target is greater than a distance threshold), no reward is given.

Specifically, the second description type is set in the following way: when the distance between the unmanned vehicle and the obstacle is less than the first threshold condition, a negative maximum penalty value is given; a discount coefficient is set based on the distance, and a discount penalty value is calculated from the discount coefficient and the maximum penalty value, when the distance between the unmanned vehicle and the obstacle is greater than the first threshold condition and less than the second threshold condition, a discount penalty value is given; and when the distance between the unmanned vehicle and the obstacle is greater than the second threshold condition, no penalty is given.

It can be expressed as follows:

$$R_{coll} = \begin{cases} \xi & \text{if } d_{coll} \leq t_{coll} & (1) \\ j * \xi & \text{if } t_{coll} < d_{coll} < m * t_{coll} & (2) \\ 0 & \text{otherwise} & (3) \end{cases}$$

where formula (1) indicates that when a distance $d_{coll}$ between the unmanned vehicle and the obstacle is less than a threshold condition $t_{coll}$ (that is, the distance between the unmanned vehicle and the obstacle is less than a first threshold condition), a penalty $\xi$ is given; formula (2) indicates that when the unmanned vehicle approaches an obstacle (that is, the distance between the unmanned vehicle and the obstacle is greater than the first threshold condition and less than a second threshold condition), a penalty j*$\xi$ is given, j represents a discount coefficient calculated based on distance, and m represents a ratio; formula (3) indicates that when the distance $d_{coll}$ between the unmanned vehicle and the obstacle is outside the threshold condition (that is, when the distance between the unmanned vehicle and the obstacle is greater than the second threshold condition), no penalty is given.

At the moment t, the complete reward function $R_t$ is expressed as:

$$R_t = R_{goal} + R_{coll}$$

The discount factor γ is an attenuation factor $\gamma \in [0, 1)$ used when calculating the rewards obtained by the unmanned vehicle performing multiple actions, and is used to adjust the output of the value function.

In the object model established in the present embodiment, the state of the unmanned vehicle is obtained without relying on sensors, and the environmental state is described using a global map picture, which overcomes problems in the prior art, such as relying on manual marking, high computational costs, relying on specific sensors, and a narrow range of applications.

In an embodiment of the present disclosure, the object model of the evaluation index used to describe the path planning result established in step S110 includes: a strategy π and a value function V.

The strategy π aims to minimize the expected time to reach the target position and target direction and avoid collisions with environmental obstacles. According to the state $s_t$ of the unmanned vehicle at the moment t, the strategy π for the unmanned vehicle to choose the action $a_t$ can be described as:

$$\pi:(a_t | s_t; \theta_t)$$

where $\theta_t$ represents the neural network parameters at the moment t. The main purpose of this strategy $\pi$ is to minimize the expected time to reach the target position $p_g$ and target direction $\theta_g$, and to avoid collisions with environmental obstacles.

The value function V is used to describe an expected gain by using the strategy $\pi$ in the state $s_t$ of the unmanned vehicle at the moment t (including the state $s_a$ of the unmanned vehicle and the environmental state $s_e$), and can be described as:

$$V(s_t;\theta_t)=\mathbb{E}[R_t|s_t]$$

where $\mathbb{E}$ represents expectations.

In an embodiment of the present disclosure, the "building a deep reinforcement learning neural network based on the object model established" in step S120 comprises:

establishing a deep reinforcement learning training framework based on a GA3C training framework to build a deep reinforcement learning neural network. The deep reinforcement learning training framework established consists of three parts: an agent composed of an unmanned vehicle, a data queue, and a GPU-based neural network.

It should be noted that GA3C refers to the asynchronous advantage actor-critic (A3C) algorithm applied to the graphics processing unit (GPU). The GA3C framework uses GPU to perform reinforcement learning training, which can improve model training speed and performance.

In an embodiment of the present disclosure, the above step S120 further comprises: adding multiple parallel computing GPUs to the GA3C training framework to build a multi-GPUs-based neural network. In the present embodiment, the deep reinforcement learning training framework consists of an agent, a data queue and a neural network of multiple GPUs.

Figure 2:
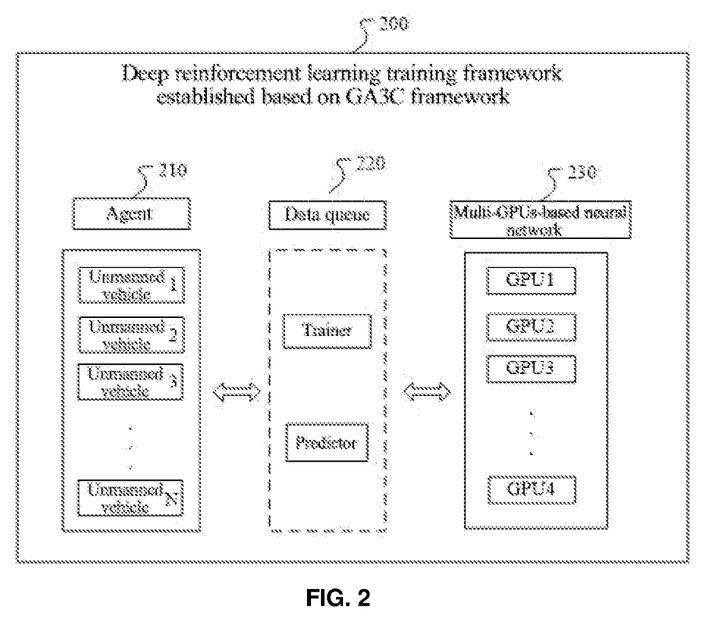
FIG. 2 is a schematic diagram of the structure of a deep reinforcement learning training framework established based on the GA3C framework according to an embodiment of the present disclosure.

FIG. 2 is a schematic diagram of the structure of a deep reinforcement learning training framework established based on the GA3C framework according to an embodiment of the present disclosure. As shown in FIG. 2, the deep reinforcement learning training framework 200 in the present embodiment comprises:

an agent 210 composed of an unmanned vehicle, which is used to interact with the external environment, obtain data such as the state s and action a of the unmanned vehicle in real time, and provide data for building a deep reinforcement learning training framework;

a data queue 220 including a predictor and a trainer; wherein the obtained training data and predicted data are stored in the data queue; the predictor selects the action a according to the current strategy $\pi$, and collects the state s, action a, and reward r as training data, and inputs them to the trainer to perform training; the predictor inputs the current state s to the neural network, obtains the strategy $\pi$ and the value function V from the neural network, and selects action a, calculate the reward r to obtain the predicted data; the trainer inputs state s, action a, and reward r to the neural network, and trains the neural network to update the parameter of the neural network; and a multi-GPUs-based neural network 230 composed of multiple parallel computing GPUs to form a multi-GPU deep reinforcement learning neural network.

The present disclosure improves the single-GPU GA3C framework to the multi-GPU GA3C framework, and the multi-GPU training mode can process training data including map pictures and unmanned vehicle states in parallel. Under the multi-GPU parallel operation method, the data processing efficiency of the GA3C framework is improved, the model training time is shortened, and the model performance is better.

Figure 3:
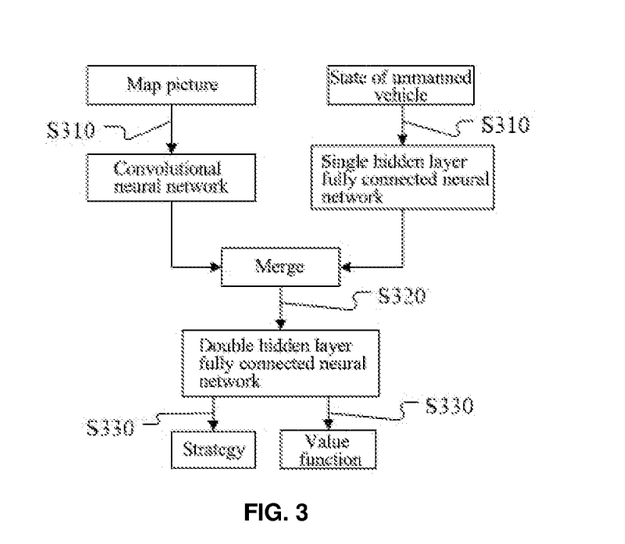
FIG. 3 is a schematic flowchart of a method for building a multi-GPUs-based neural network according to an embodiment of the present disclosure.

FIG. 3 is a schematic flowchart of a method for building a deep reinforcement learning neural network according to an embodiment of the present disclosure. A convolutional neural network and a fully connected neural network are used to build a GPU-based neural network. As shown in FIG. 3, the method for building a GPU-based neural network in the present embodiment comprises the following steps:

In step S310, a map picture is input to the convolutional neural network to obtain a feature vector of the map picture, and the state of the unmanned vehicle is input to the single hidden layer fully connected neural network to obtain a state output vector.

Among them, the map picture refers to graphical features represented by a picture, such as obstacle areas and passable areas in the task scene. The state of the unmanned vehicle includes the position, direction and speed of the unmanned vehicle, target position, target direction etc.. The map picture of the environment state and the state of the unmanned vehicle are the inputs of the GPU-based neural network.

In step S320, the feature vector of the map picture and the state output vector are concatenated and merged, and then input the concatenated and merged feature vector of the map picture and the state output vector to a double hidden layer fully connected neural network.

Among them, a hidden layer in a fully connected neural network is composed of a fully connected layer and an activation function.

In step S330, the strategy $\pi$ and the value function V are output by the double hidden layer fully connected neural network. The output of the double hidden layer fully connected neural network is the output of the GPU-based neural network.

Figure 4:
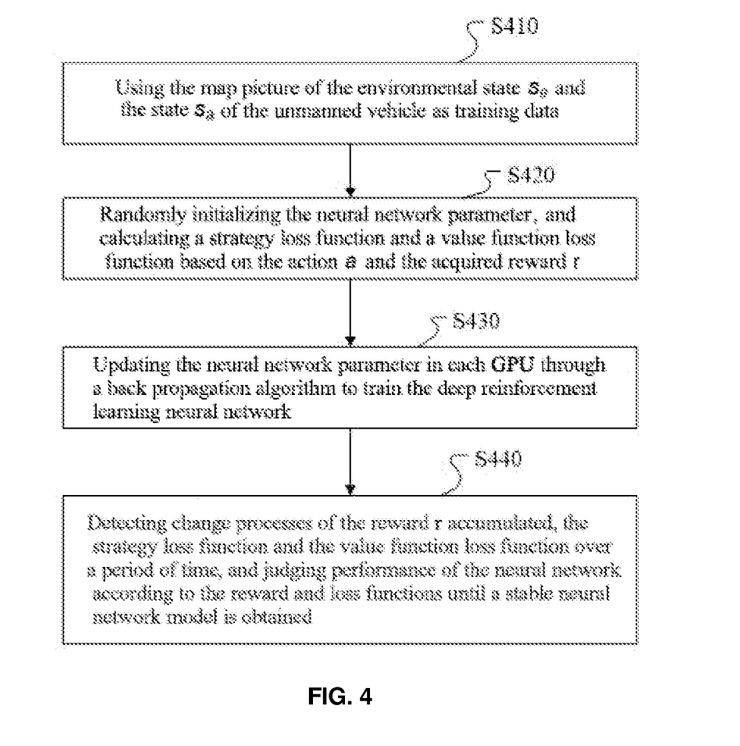
FIG. 4 is a schematic flowchart of a deep reinforcement learning neural network training method according to an embodiment of the present disclosure.

FIG. 4 is a schematic flowchart of a method for training a deep reinforcement learning neural network according to an embodiment of the present disclosure. As shown in FIG. 4, the method for training a deep reinforcement learning neural network in the present embodiment comprises the following steps:

step S410: using the map picture of the environmental state $s_e$ and the state $s_a$ of the unmanned vehicle as training data;

step S420: randomly initializing neural network parameters, and calculating a strategy loss function $f_\pi(\theta)$ and a value function loss function $f_v(\theta)$ based on the action a and the acquired reward r;

step S430: updating a neural network parameter in each GPU through a back propagation algorithm to train the deep reinforcement learning neural network;

Among them, the strategy loss function $f_\pi(\theta)$ is expressed as:

$$f\pi(\theta)=\log \pi(a_t|s_t;\theta)(R_t-V(s_t;\theta_t))+\beta H(\pi(s_t;\theta))$$

where $R_t$ represents a reward function, $V(s_t; \theta_t)$ represents a value function, and $\beta H(\pi(s_t; \theta))$ represents a regular term in the strategy loss function $f_\pi(\theta)$ which plays the role of adjusting $f_\pi(\theta)$.

The value function loss function $f_v(\theta)$ is expressed as:

$$f_v(\theta)=(R_t-V(s_t;\theta_t))^2$$

Similarly, $R_t$ represents a reward function, and $V(s_t; \theta_t)$ represents a value function.

Step S440: detecting change processes of the reward r accumulated, the strategy loss function $f_\pi(\theta)$ and the value function loss function $f_v(\theta)$ over a period of time, and judging performance of the neural network according to the reward and loss functions until a stable neural network model is obtained.

The higher the accumulated reward, the better the performance of the neural network; the lower the value of the loss function, the better the performance of the neural network. When the values of the reward and loss functions all reach a stable range, a stable neural network model can be obtained.

Figure 5:
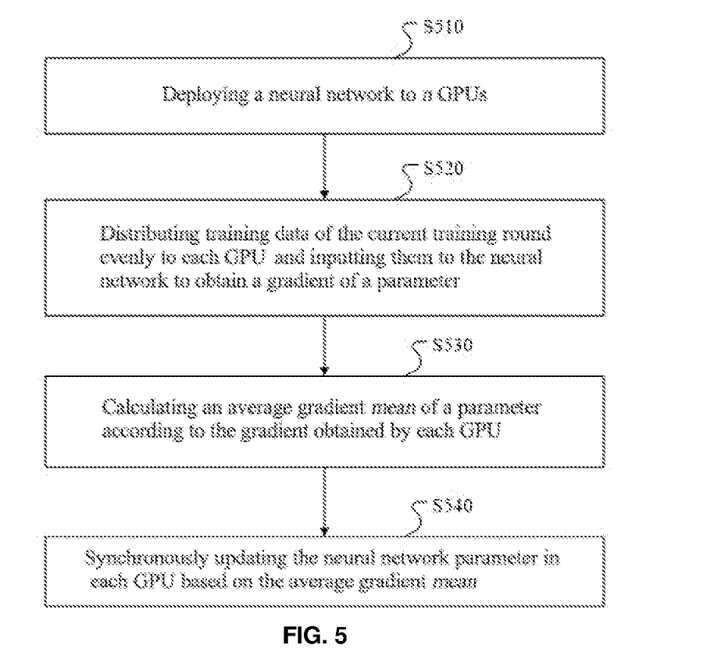
FIG. 5 is a schematic flowchart of a method for updating a neural network parameter in each GPU according to an embodiment of the present disclosure.

FIG. 5 is a schematic flowchart of a method for updating neural network parameters in each GPU according to an embodiment of the present disclosure. As shown in FIG. 5, in the step S430, "updating a neural network parameter in each GPU through a back propagation algorithm" comprises the following steps:

step S510: deploying a neural network to n GPUs, n≥2;
step S520: distributing training data of a current training round evenly to each GPU and inputting them to the neural network to obtain a gradient (grad, var) of a parameter; where grad represents the gradient and var represents a variable.
step S530: calculating an average gradient mean(grad, var) of a parameter according to the gradient (grad, var) obtained by each GPU;
step S540: synchronously updating the neural network parameter in each GPU based on the average gradient mean(grad, var).

In an embodiment of the present disclosure, in the above step S130, "generating a motion path of the unmanned vehicle according to the evaluation index of the path planning result output by the deep reinforcement learning neural network" comprises:

selecting an action with a highest probability in the strategy n output and taking it as a current action of the unmanned vehicle, continuously inputting map pictures of the environment state and states of the unmanned vehicle in the current task scene into the deep reinforcement learning neural network after trained until the unmanned vehicle reaches the target, obtaining all actions of the unmanned vehicle from a starting point to a target, and generating the motion path of the unmanned vehicle.

To sum up, according to the technical solution of the present disclosure, the global map picture of the environmental state and the state of the unmanned vehicle are used as inputs, the method of constructing the map and the method of obtaining the state of the unmanned vehicle do not rely on specific sensors, and thus it has a wide range of applications; the environmental information in the scene is marked by the map picture, the map features are extracted through the deep neural network, and the map picture of the scene is used to realize the path planning, thereby simplifying the modeling process; a deep reinforcement learning network is established using neural network structures such as a convolutional neural network and a fully connected neural network, and the GA3C framework based on a single GPU is improved to the GA3C framework based on multiple GPUs, so that under the multi-GPU parallel operation method, the data processing efficiency is improved, the model training time is shortened, and the model performance is better.

Figure 6:
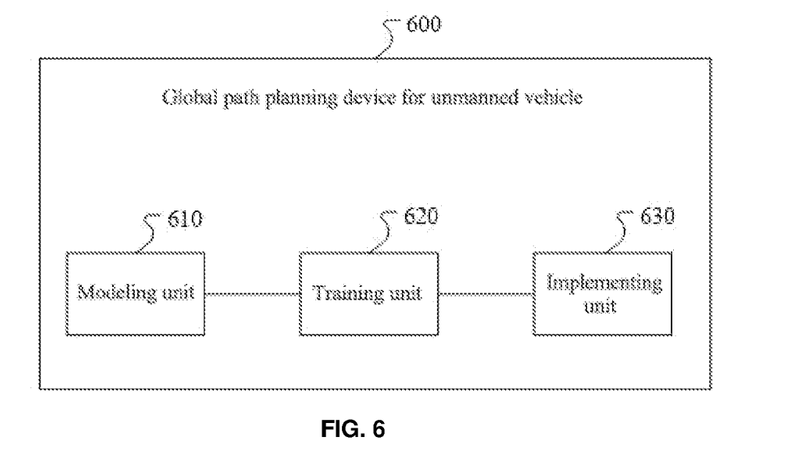
FIG. 6 is a schematic diagram of the structure of a global path planning device for an unmanned vehicle according to an embodiment of the present disclosure.

FIG. 6 is a schematic diagram of the structure of a global path planning device for an unmanned vehicle according to an embodiment of the present disclosure. As shown in FIG. 6, the global path planning device for an unmanned vehicle 600 in the present embodiment comprises:

a modeling unit 610 for establishing an object model for describing a sequential decision making process of unmanned vehicle path planning through a reinforcement learning method, wherein the object model includes: a state of the unmanned vehicle, an environmental state described by a map picture, and an evaluation index of a path planning result;

a training unit 620 for building a deep reinforcement learning neural network based on the object model established, and training the deep reinforcement learning neural network using the state of the unmanned vehicle and the map picture of the environmental state until a stable neural network model is obtained; and an implementing unit 630 for, after path planning is initiated, inputting the map picture of the environment state and the state of the unmanned vehicle in a current task scene into the deep reinforcement learning neural network after trained, and generating a motion path of the unmanned vehicle according to the evaluation index of the path planning result output by the deep reinforcement learning neural network.

In an embodiment of the present disclosure, the modeling unit 610 is specifically for describing the object model using a Markov decision process $\{s, a, p, r, \gamma\}$, and the object model includes: a state s, an action a, a state transition model p, a reward r, and a discount factor $\gamma$;

the state s includes: the state $s_a$ of the unmanned vehicle and the environmental state $s_e$, and a current state $s_t$ at a moment t is expressed as $s_t=[s_a; s_e]$; the state of the unmanned vehicle is obtained without relying on a sensor, and the state $s_a$ of the unmanned vehicle includes a position, a direction, a size and a current speed of the unmanned vehicle, a target position and a target direction; the map picture describing the environmental state $s_e$ is a global map picture on which at least passable areas and obstacle areas of the map are marked;

the action a includes a linear velocity and an angular velocity of the unmanned vehicle in a body coordinate system, and an action at a moment t is expressed as $a_t$;

the state transition model p represents a probability of the unmanned vehicle taking the action $a_t$ in the current state $s_t$ to transfer to the next state $s_{t+1}$;

the reward r describes a reward given to an action taken by the unmanned vehicle, and the reward includes at least two description types: a first description type which is a reward given when the unmanned vehicle reaches or approaches a target, and a second description type which is a penalty given when the unmanned vehicle collides or approaches an obstacle; and the discount factor $\gamma$ is an attenuation factor used when calculating rewards acquired by the unmanned vehicle for performing multiple actions, and is used to adjust an output of the value function.

Further, the modeling unit 610 is specifically for setting the first description type in the following way:

when the unmanned vehicle reaches the target position, a positive maximum reward value is given;
a discount coefficient is set based on distance, a discount reward value is calculated from the discount coefficient and a maximum reward value; when a distance between the unmanned vehicle and the target position is less than a distance threshold, the discount reward value is given; and
when the distance between the unmanned vehicle and the target position is greater than the distance threshold, no reward is given;

Further, the modeling unit 610 is further specifically for setting the second description type in the following way:

when the distance between the unmanned vehicle and the obstacle is less than a first threshold condition, a negative maximum penalty value is given;

a discount coefficient is set based on distance, and a discount penalty value is calculated from the discount coefficient and a maximum penalty value, when the distance between the unmanned vehicle and the obstacle is greater than the first threshold condition and less than a second threshold condition, a discount penalty value is given; and when the distance between the unmanned vehicle and the obstacle is greater than the second threshold condition, no penalty is given.

In an embodiment of the present disclosure, the training unit 620 comprises:

a training framework constructing module for establishing a deep reinforcement learning training framework based on a GA3C framework; and a neural network constructing module for adding multiple parallel computing GPUs to the GA3C framework to build a multi-GPU deep reinforcement learning neural network.

In an embodiment of the present disclosure, the training framework constructing module is specifically for:

establishing a deep reinforcement learning training framework consisting of three parts: an agent composed of an unmanned vehicle, a data queue, and the multi-GPUs-based neural network;

wherein the agent interacts with an external environment, the data queue includes a predictor and a trainer, and training data and predicted data obtained are stored in the data queue;

an action a is selected according to the current strategy $\pi$ through the predictor, and the state s, action a, and reward r are collected as training data and input to the trainer to perform training;

a current state s is input to the neural network through the predictor, the strategy $\pi$ and the value function V are obtained from the neural network, an action a is selected, and the reward r is calculated to obtain predicted data;

the state s, action a, and reward r are input to the neural network through the trainer, and the neural network is trained to update parameters of the neural network.

In an embodiment of the present disclosure, the deep reinforcement learning neural network constructing module is specifically for building the multi-GPU neural network using a convolutional neural network and a fully connected neural network, wherein the map picture of the environment state and the state of the unmanned vehicle are used as inputs of the multi-GPU neural network, the neural network constructing module inputs the map picture to the convolutional neural network to obtain a feature vector of the map picture, and inputs the state of the unmanned vehicle to a single hidden layer fully connected neural network to obtain a state output vector; the feature vector and the state output vector of the map picture are concatenated and merged and then input to a double hidden layer fully connected neural network, and the double hidden layer fully connected neural network outputs the strategy $\pi$ and the value function V; and an output of the double hidden layer fully connected neural network is an output of the multi-GPU neural network.

In an embodiment of the present disclosure, the training unit 620 is further specifically for using the map picture of the environmental state $s_e$ and the state of the unmanned vehicle $s_a$ as training data;

randomly initializing neural network parameters, and calculating a strategy loss function and a value function loss function based on the action a and the acquired reward r;

updating neural network parameters in each GPU through a back propagation algorithm to train the deep reinforcement learning neural network; and detecting change processes of the reward r accumulated, the strategy loss function and the value function loss function over a period of time, and judging a performance of the neural network according to the reward and loss functions until a stable neural network model is obtained.

In the training unit 620, "updating neural network parameters in each GPU through a back propagation algorithm" comprises: deploying a neural network to n GPUs, n$\geq$2; distributing training data of a current training round evenly to each GPU and inputting them to the neural network to obtain a gradient (grad, var) of a parameter; calculating an average gradient mean(grad, var) of a parameter according to the gradient (grad, var) obtained by each GPU; synchronously updating neural network parameters in each GPU based on the average gradient mean(grad, var).

In an embodiment of the present disclosure, the implementing unit 630 is specifically for selecting an action with a highest probability in the strategy $\pi$ output and taking it as a current action of the unmanned vehicle, obtaining all actions of the unmanned vehicle from a starting point to a target, and generating the motion path of the unmanned vehicle.

The device embodiments described above are merely illustrative, and the specific implementation details may refer to the specific implementation details of the foregoing method embodiments, which will not be repeated herein.

It should be noted that the modules described as separate components in the device embodiments may or may not be physically separated, in other words, they may be located in one place, or they may be distributed on multiple modules. Some or all of the modules may be selected according to actual needs to achieve the objectives of the solutions of the embodiments. Those of ordinary skill in the art can understand and implement it without paying creative work.

The above are only specific embodiments of the present disclosure. Based on the above teaching of the present disclosure, those skilled in the art can make other improvements or modifications based on the above embodiments. Those skilled in the art should understand that the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A global path planning method for an unmanned vehicle, comprising:
   establishing an object model for describing a sequential decision making process of unmanned vehicle path planning through a reinforcement learning method, based on GA3C, an asynchronous advantage actor-critic (A3C) algorithm applied to a graphics processing unit (GPU), and performing a path planning in order to obtain an evaluation index of a path planning result, wherein the object model includes: a state of the unmanned vehicle, an environmental state described by a map picture, and the evaluation index of a path planning result;
   building a deep reinforcement learning neural network based on the object model established, and training the deep reinforcement learning neural network using the state of the unmanned vehicle and the map picture of the environmental state until a trained neural network model is obtained; and
   after path planning is initiated, inputting the map picture of the environment state and the state of the unmanned vehicle in a current task scene into the deep reinforcement learning neural network after trained, and generating a motion path of the unmanned vehicle according to the evaluation index of the path planning result output by the deep reinforcement learning neural network.

2. The method according to claim 1, wherein the state $s_a$ of the unmanned vehicle includes a position, a direction, a size and a current speed of the unmanned vehicle, a target position and a target direction;
   the map picture describing the environmental state $s_e$ is a global map picture on which at least passable areas and obstacle areas of the map are marked;
   the evaluation index of the path planning result includes: a strategy $\pi$ and a value function V;
   the strategy $\pi$ aims to minimize expected time to reach the target position and target direction, and avoid collisions with environmental obstacles; and
   the value function V is used to describe an expected gain by using the strategy $\pi$ in the state $s_a$ of the unmanned vehicle and the environmental state $s_e$.

3. The method according to claim 2, wherein
   the object model is described using a Markov decision process $\{s, a, p, r, \gamma\}$, and the object model includes: a state s, an action a, a state transition model p, a reward r, and a discount factor $\gamma$;
   the state s includes: the state $s_a$ of the unmanned vehicle and the environmental state $s_e$, and a current state $s_t$ at a moment t is expressed as $s_t=[s_a; s_e]$;
   the action a includes a linear velocity and an angular velocity of the unmanned vehicle in a body coordinate system, and an action at a moment t is expressed as $a_t$;
   the state transition model p represents a probability of the unmanned vehicle taking the action $a_t$ in the current state $s_t$ to transfer to a next state $s_{t+1}$;
   the reward r describes a reward given to an action taken by the unmanned vehicle, and the reward includes at least two description types: a first description type which is a reward given when the unmanned vehicle reaches or approaches a target, and a second description type which is a penalty given when the unmanned vehicle collides or approaches an obstacle; and
   the discount factor $\gamma$ is an attenuation factor used when calculating rewards acquired by the unmanned vehicle for performing multiple actions, and is used to adjust an output of the value function.

4. The method according to claim 3, wherein
   the first description type is set in the following way:
   when the unmanned vehicle reaches the target position, giving a positive maximum reward value;
   setting a discount coefficient based on distance, calculating a discount reward value from the discount coefficient and a maximum reward value; when a distance between the unmanned vehicle and the target position is less than a distance threshold, giving the discount reward value; and
   when the distance between the unmanned vehicle and the target position is greater than the distance threshold, giving no reward;
   the second description type is set in the following way:
   when the distance between the unmanned vehicle and the obstacle is less than a first threshold condition, giving a negative maximum penalty value;
   setting a discount coefficient based on distance, and calculating a discount penalty value from the discount coefficient and a maximum penalty value, when the distance between the unmanned vehicle and the obstacle is greater than the first threshold condition and less than a second threshold condition, giving a discount penalty value; and
   when the distance between the unmanned vehicle and the obstacle is greater than the second threshold condition, giving no penalty.

5. The method according to claim 4, wherein
   at the moment t, a complete reward function is as follows:

$$R_t = R_{goal} + R_{coll}$$

where $R_{goal}$ is a reward of the first description type, and $R_{coll}$ is a reward of the second description type.

6. The method according to claim 3, wherein generating a motion path of the unmanned vehicle according to the evaluation index of the path planning result output by the deep reinforcement learning neural network comprises:
   selecting an action with a highest probability in the output strategy $\pi$ and taking it as a current action of the unmanned vehicle, obtaining all actions of the unmanned vehicle from a starting point to a target, and generating the motion path of the unmanned vehicle.

7. The method according to claim 3, wherein building a deep reinforcement learning neural network based on the object model established comprises:
   establishing a deep reinforcement learning training framework based on a GA3C training framework to build a deep reinforcement learning neural network, wherein the deep reinforcement learning training framework established consists of three parts: an agent composed of an unmanned vehicle, a data queue, and a GPU-based neural network;
   the agent interacts with an external environment, the data queue includes a predictor and a trainer, and training data and predicted data obtained are stored in the data queue;
   selecting an action a according to the current strategy $\pi$ through the predictor, collecting the state s, action a, and reward r as training data and inputting the training data to the trainer to perform training;

inputting a current state s to the GPU-based neural network through the predictor, obtaining the strategy π and the value function V from the GPU-based neural network, selecting an action a, and calculating the reward r to obtain predicted data;

inputting the state s, action a, and reward r to the GPU-based neural network through the trainer, and training the GPU-based neural network to update a parameter of the GPU-based neural network.

8. The method according to claim 7, wherein multiple parallel computing GPUs are added to the GA3C training framework to build a multi-GPUs-based neural network; and the deep reinforcement learning training framework consists of an agent, a data queue and the multi-GPUs-based neural network.

9. The method according to claim 8, wherein building a deep reinforcement learning neural network comprises:

building the GPU-based neural network using a convolutional neural network and a fully connected neural network, wherein the map picture of the environment state and the state of the unmanned vehicle are used as inputs of the GPU-based neural network;

inputting the map picture to the convolutional neural network to obtain a feature vector of the map picture, and inputting the state of the unmanned vehicle to a single hidden layer fully connected neural network to obtain a state output vector; concatenating and merging the feature vector of the map picture and the state output vector, and then inputting the concatenated and merged feature vector of the map picture and the state output vector to a double hidden layer fully connected neural network, and outputting the strategy π and the value function V by the double hidden layer fully connected neural network; and an output of the GPU-based neural network is an output of the double hidden layer fully connected neural network.

10. The method according to claim 9, wherein training the deep reinforcement learning neural network using the state of the unmanned vehicle and the map picture of the environmental state until a trained neural network model is obtained comprising:

using the map picture of the environmental state $s_e$ and the state $s_a$ of the unmanned vehicle as training data;

randomly initializing the neural network parameter, and calculating a strategy loss function and a value function loss function based on the action a and the acquired reward r;

updating the neural network parameter in each GPU through a back propagation algorithm to train the deep reinforcement learning neural network; and detecting change processes of the reward r accumulated, the strategy loss function and the value function loss function over a period of time, and judging a performance of the neural network according to the reward and loss functions until a trained neural network model is obtained.

11. The method according to claim 10, wherein updating neural network parameters in each GPU through a back propagation algorithm comprises:

deploying a neural network to n GPUs, n≥2;

distributing training data of a current training round evenly to each GPU and inputting them to the neural network to obtain a gradient of a parameter;

calculating an average gradient of a parameter according to the gradient obtained by each GPU;

synchronously updating neural network parameter in each GPU based on the average gradient.

12. A global path planning device for an unmanned vehicle, comprising a memory for storing computer instructions, wherein the computer instructions cause the global path planning device to perform the following processing:

establishing an object model for describing a sequential decision making process of unmanned vehicle path planning through a reinforcement learning method based on GA3C, an asynchronous advantage actor-critic (A3C) algorithm applied to a graphics processing unit (GPU), and performing a path planning in order to obtain an evaluation index of a path planning result, wherein the object model includes: a state of the unmanned vehicle, an environmental state described by a map picture, and an evaluation index of a path planning result;

building a deep reinforcement learning neural network based on the object model established, and training the deep reinforcement learning neural network using the state of the unmanned vehicle and the map picture of the environmental state until a trained neural network model is obtained; and after path planning is initiated, inputting the map picture of the environment state and the state of the unmanned vehicle in a current task scene into the deep reinforcement learning neural network after trained, and generating a motion path of the unmanned vehicle according to the evaluation index of the path planning result output by the deep reinforcement learning neural network.

13. The device according to claim 12, wherein the computer instructions further cause the global path planning device to perform the following processing:

establishing a deep reinforcement learning training framework based on a GA3C training framework, and building a deep reinforcement learning neural network; and adding multiple parallel computing GPUs to the GA3C training framework to build a multi-GPUs-based neural network, wherein the deep reinforcement learning training framework consists of an agent, a data queue and the multi-GPUs-based neural network.

14. The device according to claim 13, wherein the computer instructions further cause the global path planning device to perform the following processing: establishing a deep reinforcement learning training framework based on a GA3C training framework to build a deep reinforcement learning neural network, wherein the deep reinforcement learning training framework established consists of three parts: an agent composed of an unmanned vehicle, a data queue, and a GPU-based neural network;

the agent interacts with an external environment, the data queue includes a predictor and a trainer, and training data and predicted data obtained are stored in the data queue;

an action a is selected according to the current strategy π through the predictor, and the state s, action a, and reward r are collected as training data and input to the trainer to perform training;

a current state s is input to the GPU-based neural network through the predictor, the strategy π and the value function V are obtained from the GPU-based neural network, an action a is selected, and the reward r is calculated to obtain predicted data;

the state s, action a, and reward r are input to the GPU-based neural network through the trainer, and the GPU-based neural network is trained to update a parameter of the GPU-based neural network.

15. The device according to claim 13, wherein the computer instructions further cause the global path planning device to perform the following processing: building the GPU-based neural network using a convolutional neural network and a fully connected neural network, wherein
the map picture of the environment state and the state of the unmanned vehicle are used as inputs of the GPU-based neural network,
the map picture is input to the convolutional neural network to obtain a feature vector of the map picture, and the state of the unmanned vehicle is input to a single hidden layer fully connected neural network to obtain a state output vector; the feature vector and the state output vector of the map picture are concatenated and merged and then input to a double hidden layer fully connected neural network, and the double hidden layer fully connected neural network outputs the strategy $\pi$ and the value function V; and
an output of the GPU-based neural network is an output of the double hidden layer fully connected neural network.

16. The device according to claim 15, wherein the computer instructions further cause the global path planning device to perform the following processing:
using the map picture of the environmental state $s_e$ and the state $s_a$ of the unmanned vehicle as training data;
randomly initializing the neural network parameter, and calculating a strategy loss function and a value function loss function based on the action a and the acquired reward r;
updating the neural network parameter in each GPU through a back propagation algorithm to train the deep reinforcement learning neural network; and
detecting change processes of the reward r accumulated, the strategy loss function and the value function loss function over a period of time, and judging a performance of the neural network according to the reward and loss functions until a trained neural network model is obtained.

17. The device according to claim 12, wherein the computer instructions further cause the global path planning device to perform the following processing: describing the object model using a Markov decision process $\{s, a, p, r, \gamma\}$, and the object model includes: a state s, an action a, a state transition model p, a reward r, and a discount factor $\gamma$;
the state s includes: the state $s_a$ of the unmanned vehicle and the environmental state $s_e$, and a current state $s_t$ at a moment t is expressed as $s_t=[s_a; s_e]$;
the action a includes a linear velocity and an angular velocity of the unmanned vehicle in a body coordinate system, and an action at a moment t is expressed as $a_t$;
the state transition model p represents a probability of the unmanned vehicle taking the action $a_t$ in the current state $s_t$ to transfer to a next state $s_{t+1}$;
the reward r describes a reward given to an action taken by the unmanned vehicle, and the reward includes at least two description types: a first description type which is a reward given when the unmanned vehicle reaches or approaches a target, and a second description type which is a penalty given when the unmanned vehicle collides or approaches an obstacle; and
the discount factor $\gamma$ is an attenuation factor used when calculating rewards acquired by the unmanned vehicle for performing multiple actions, and is used to adjust an output of the value function.

18. The device according to claim 17, wherein the computer instructions further cause the global path planning device to perform the following processing: setting the first description type in the following way:
when the unmanned vehicle reaches the target position, a positive maximum reward value is given;
a discount coefficient is set based on distance, a discount reward value is calculated from the discount coefficient and a maximum reward value; when a distance between the unmanned vehicle and the target position is less than a distance threshold, the discount reward value is given; and
when a distance between the unmanned vehicle and the target position is greater than the distance threshold, no reward is given;
setting the second description type in the following way:
when the distance between the unmanned vehicle and the obstacle is less than a first threshold condition, a negative maximum penalty value is given;
a discount coefficient is set based on distance, and a discount penalty value is calculated from the discount coefficient and a maximum penalty value, when the distance between the unmanned vehicle and the obstacle is greater than the first threshold condition and less than a second threshold condition, a discount penalty value is given; and
when the distance between the unmanned vehicle and the obstacle is greater than the second threshold condition, no penalty is given.

* * * * *